(12) United States Patent
Flögel

(10) Patent No.: US 6,425,291 B1
(45) Date of Patent: Jul. 30, 2002

(54) RELATIVE-PRESSURE SENSOR HAVING A GAS-FILLED BELLOWS

(75) Inventor: Karl Flögel, Schopfheim (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/604,359

(22) Filed: Jun. 27, 2000

Related U.S. Application Data
(60) Provisional application No. 60/147,574, filed on Aug. 6, 1999.

(30) Foreign Application Priority Data

Jul. 1, 1999 (EP) .............................................. 99112538

(51) Int. Cl.[7] ................................................. G01L 7/06
(52) U.S. Cl. ..................................................... 73/729.1
(58) Field of Search ........................... 73/704, 706, 708, 73/715–727, 729.1

(56) References Cited

U.S. PATENT DOCUMENTS

| | | | |
|---|---|---|---|
| 3,724,275 A | * 4/1973 | Battaglini et al. ............ | 73/716 |
| 4,212,209 A | 7/1980 | Newbold et al. ............. | 73/721 |
| 4,218,925 A | * 8/1980 | DiDomizio, Jr. ............. | 73/706 |
| 4,425,799 A | 1/1984 | Park ............................ | 73/718 |
| 5,457,999 A | * 10/1995 | Feldman ..................... | 73/704 |

OTHER PUBLICATIONS

Vincent, J.H., and Humpston, G., "Lead–Free Solders for Electronic Assembly", 645 *The GEC Jouranl of Research*, 11 (1994) No. 2, Chelmsford, Essex, GB, vol. II, No. 2, 1994, 14 pages (No month).

* cited by examiner

*Primary Examiner*—William Oen
(74) *Attorney, Agent, or Firm*—Bose McKinney & Evans LLP

(57) ABSTRACT

A relative-pressure sensor is provided which is protected against contaminants and/or moisture and manages without an oil filling, having a gas-filled measuring chamber (5), which is sealed with a pressure-sensitive measuring diaphragm (3), on the outside of which a pressure (P) to be measured acts during operation, a gas-filled compressible resilient bellows (17, 18), on which a reference pressure (R) acts from outside during operation, whose internal volume depends on the reference pressure (R), and which is connected to the measuring chamber (5) in order to adapt an internal pressure prevailing in the measuring chamber (5) to the reference pressure (R), and a transducer for converting a pressure-dependent deflection of the measuring diaphragm, (3) into an electric measured variable.

13 Claims, 1 Drawing Sheet

RELATIVE-PRESSURE SENSOR HAVING A GAS-FILLED BELLOWS

REFERENCE TO OTHER APPLICATIONS

This application claims the benefit of U.S. Provisional Application No. 60/147,574, filed Aug. 6, 1999.

FIELD OF THE INVENTION

The invention relates to a relative-pressure sensor.

BACKGROUND OF THE INVENTION

A distinction is made in pressure-measuring technology between differential-pressure, absolute-pressure and relative-pressure sensors. Differential-pressure sensors measure a difference between two different pressures. Absolute-pressure sensors measure pressures in absolute terms, that is, as a pressure difference with respect to a vacuum. A relative-pressure sensor measures a pressure difference with respect to a reference pressure. The reference pressure is an ambient pressure where the sensor is located. In most applications, this is the atmospheric pressure at the place of use. Relative-pressure sensors normally have a measuring chamber which is sealed with a pressure-sensitive measuring diaphragm. During operation, the pressure to be measured acts on the outside surface of the diaphragm. On a surface that opposes the diaphragm, the chamber has an opening by which the reference pressure is presented to the interior of the chamber at the measuring diaphragm. A transducer is provided which converts a deflection of the diaphragm into an electrically measured variable which is a function of the reference pressure and of the pressure to be measured.

A disadvantage of such sensors is that pollutants and/or moisture which impair the measuring accuracy may pass into the measuring chamber through the opening which supplies the reference pressure. Pollutants can be, for example, dust particles contained in the air, but also suspended or etching matter which is present at the place of use. If the temperature in the surroundings is higher than the temperature in the interior of the chamber, then condensate may form in the interior of the chamber.

Electromechanical transducers used to detect the deflection of the measuring diaphragm are generally very sensitive to pollutants and/or moisture.

EP-B 524 550 describes a relative-pressure sensor having a gas-filled measuring chamber which is sealed with a pressure-sensitive measuring diaphragm, on the outside of which a pressure to be measured acts during operation, and a transducer for converting into an electric measured variable a deflection of the diaphragm dependent on the pressure to be measured.

EP-B 524 550 also describes a second gas-filled chamber which is sealed with a second pressure-sensitive diaphragm on whose outside the reference pressure acts during operation. A second transducer is provided for converting a pressure-dependent deflection of the second diaphragm into an electric variable. The measuring chamber and the second chamber are interconnected via a line. The volume of the two chambers is, however, sufficiently large for the deflections of the measuring diaphragm and of the second diaphragm to be largely independent of one another. The relative-pressure sensor therefore effectively comprises two separate sensors of which one senses the pressure to be measured, and the other senses the reference pressure. The measured variables determined independently of one another are subsequently combined with one another to determine the relative pressure.

A disadvantage of such a relative-pressure sensor is that two transducers are required in order to detect the reference pressure and the pressure to be measured independently of one another. This means a higher outlay and higher costs in production.

A further disadvantage is that the two chambers have a large internal volume in order to decouple the two sensors. The gas quantity contained therein is correspondingly large. The pressure in the interior of the chambers rises or drops with temperature. A higher or lower pressure in the interior leads to a deflection of the two diaphragms and to measuring errors. It should be appreciated that the smaller at least one of the pressures to be determined, the stronger the effect of this source of error. The measuring errors of the two pressure measurements cumulatively effect this form of determination of relative pressure.

A differential-pressure sensor having two oil-filled chambers interconnected via a conduit is described in U.S. Pat. No. 4,425,799. Each chamber is sealed with a pressure-sensitive diaphragm. During operation, one of the pressures whose difference is to be measured works on each diaphragm. The oil serves as pressure transmitter, and has a substantially smaller coefficient of thermal expansion than air. There is thus a need for only one transducer, which detects the deflection of one of the two diaphragms which depends on the pressure difference, and converts the detected deflection into an electric variable.

However, there are many applications in which, for reasons of safety, the use of oil-filled sensors is precluded, as there is a risk that a diaphragm may be damaged and oil may escape. Examples of such applications can be found, in particular, in the food industry and in the production and storage of paints.

SUMMARY OF THE INVENTION

It is an object of the invention to specify a relative-pressure sensor which is protected against pollutants and/or moisture and manages without an oil filling.

For this purpose, the invention comprises a relative-pressure sensor having a gas-filled measuring chamber, which is sealed with a pressure-sensitive measuring diaphragm, on the outside of which a pressure to be measured acts during operation, a gas-filled compressible resilient bellows, on which a reference pressure acts from outside during operation, whose internal volume depends on the reference pressure, and which is connected to the measuring chamber in order to adapt an internal pressure prevailing in the measuring chamber to the reference pressure, and a transducer for converting a pressure-dependent deflection of the measuring diaphragm into an electric measured variable.

In accordance with another preferred embodiment of the invention, the bellows comprises two diaphragms, preferably corrugated diaphragms, interconnected at their outer edge.

In accordance with a further embodiment of the invention, the measuring diaphragm is arranged on a basic body, the basic body has a continuous bore, and the bellows includes a corrugated diaphragm which is connected with an outer edge to a rear side of the basic body averted from the measuring diaphragm and covers the bore.

In a still further embodiment of the invention, the bellows has a stiffness which is small by comparison with a stiffness of the measuring diaphragm.

In a particular and preferred embodiment of the invention, the bellows comprises a high-grade steel or a copper-beryllium alloy.

BRIEF DESCRIPTION OF THE DRAWINGS

The invention and further advantages will now be explained in more detail with the aid of the figures of the drawing, in which two exemplary embodiments are represented. Identical elements are provided in the figures with the identical reference symbols.

DETAILED DESCRIPTION OF EXEMPLARY EMBODIMENTS

Figure 1:
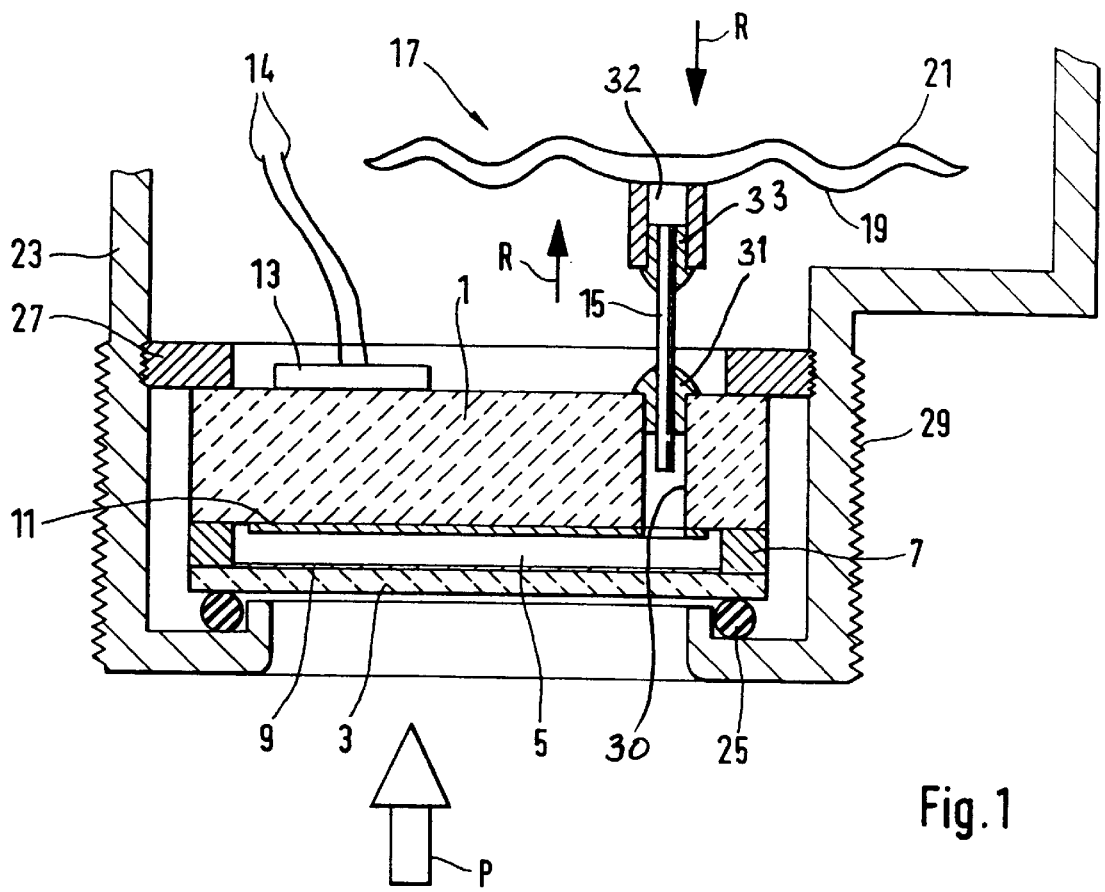
FIG. 1 shows a section through a relative-pressure sensor having a bellows comprising two diaphragms.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

A section through a relative-pressure sensor according to the invention is represented in FIG. 1. In the exemplary embodiment shown, the heart of the relative-pressure sensor is a capacitive ceramic pressure-measuring cell. The latter has a basic body 1 and a measuring diaphragm 3. The basic body 1 is made, for example, of ceramic. The measuring diaphragm 3 can likewise be made of ceramic or, for example, sapphire. The measuring diaphragm 3 and the basic body 1 are interconnected in a pressure-tight and gas tight fashion at their edge with the formation of a measuring chamber 5 by means of a joint 7. In particular, the measuring diaphragm 3 and the basic body 1 of an exemplary embodiment are interconnected via a brazing process that utilizes active brazing solder to form joint 7. The measuring diaphragm 3 is pressure-sensitive, that is to say a pressure acting on the measuring diaphragm 3 causes a deflection of the diaphragm 3 from a position of rest. The measuring diaphragm 3 seals the measuring chamber 5.

An electrode 9 is arranged on an inner side of the measuring diaphragm 3, and at least one counterelectrode 11 is arranged on an opposite inner side of the basic body 1. The electrode 9 of the measuring diaphragm 3 has electric contact made with it through the joint 7, and is connected outside the frame, for example. The counterelectrode 11 on the basic body 1 has electric contact made with it through the basic body 1 to the outside thereof, and leads to an electronic circuit 13 arranged on the basic body 1. The electrode 9 and counterelectrode 11 form a capacitor, and the electronic circuit 13 converts the changes in capacitance of the capacitor into, for example, an electric voltage which changes correspondingly.

During operation, a pressure P to be measured acts on an outer surface of the diaphragm 3. This is represented symbolically in FIG. 1 by an arrow. The pressure P causes a pressure-dependent deflection of the diaphragm 3 which is converted into an electric measured variable by a transducer. In the case of the exemplary embodiment described, the transducer comprises the electrode 9, the counterelectrode 11 and the electronic circuit 13, and the electric measured variable is, for example, a voltage. The measured variable is available via connecting lines 14 for further processing and/or evaluation.

Instead of the capacitive ceramic measuring cell described, it is also possible, for example, to use a piezo resistive measuring cell. In the case of these types of measuring cells, the transducer has strain gauges applied to the measuring diaphragm. With these measuring cells, the measuring chamber can also be formed by a basic body, on which the measuring diaphragm is fastened with its outer edge, and the measuring diaphragm itself.

Referring back to the embodiment depicted in FIG. 1, the basic body 1 has a continuous bore 30 into which a tube 15 is inserted. Arranged at an end of the tube 15 averted from the basic body 1 is a resilient bellows 17 on which a reference pressure R acts on all sides from outside during operation. This is illustrated in FIG. 1 by arrows. The interior of the bellows 17 is connected to the measuring chamber 5 via the tube 15 and connection chamber 32. In particular, the connection chamber 32 of an exemplary embodiment is implemented as a tubular metal device having an upper portion soldered to the bellows 17 and a lower portion soldered to the connection tube 15 via a solder ring 33 of active brazing solder. The measuring chamber 5, the tube 15 and the bellows 17 are filled with a gas, for example with air. The gas-filled space is sealed in a hermetically tight fashion, and therefore reliably protected against moisture and/or pollutants.

The bellows 17 is compressible. Consequently, its internal volume is dependent on the reference pressure R acting on the bellows 17 from outside. If the reference pressure R rises, the bellows 17 is compressed and the pressure in the interior of the bellows 17 rises until an equilibrium of forces is set up on the bellows 17. Since the interior of the bellows 17 is connected to the measuring chamber 3 via the tube 15, an internal pressure prevailing in the measuring chamber 5 is equal to the pressure which is build up in the interior of the bellows 17 as a function of the reference pressure R.

In the exemplary embodiment represented in FIG. 1, the bellows 17 comprises two thin measuring diaphragms 19, 21 interconnected at their outer edges by solder. As represented in FIG. 1, the two diaphragms 19, 21 are preferably constructed as corrugated diaphragms of steel. This offers the advantage of the internal volume of the bellows 17 being relatively small under an average reference pressure, while the bellows 17 can substantially increase its internal volume through a deflection of the two diaphragms away from one another. This means, on the one hand, that only a small gas quantity, which expands with temperature, is present, and, on the other hand, that a temperature-induced expansion of the gas is picked up by the bellows 17 without a substantial change in the pressure which is set up in the interior of the bellows 17 and thus in the measuring chamber 5 under a specified reference pressure R.

The relative-pressure sensor has a housing 23 in which the capacitive ceramic measuring cell is clamped. For this purpose, the housing 23 has an opening with a shoulder which extends radially inwards and on which the measuring diaphragm 3 rests with an outer, pressure-sensitive edge with the interposition of a seal 25, for example an O ring. On a side of the measuring cell averted from the measuring membrane, there is screwed into the housing 23 a threaded ring 27 by means of which the measuring cell is pressed against the seal 25. An external thread 29 is provided on the housing 23 to fasten the sensor at a measuring site. Other types of fastening can likewise be employed.

Figure 2:
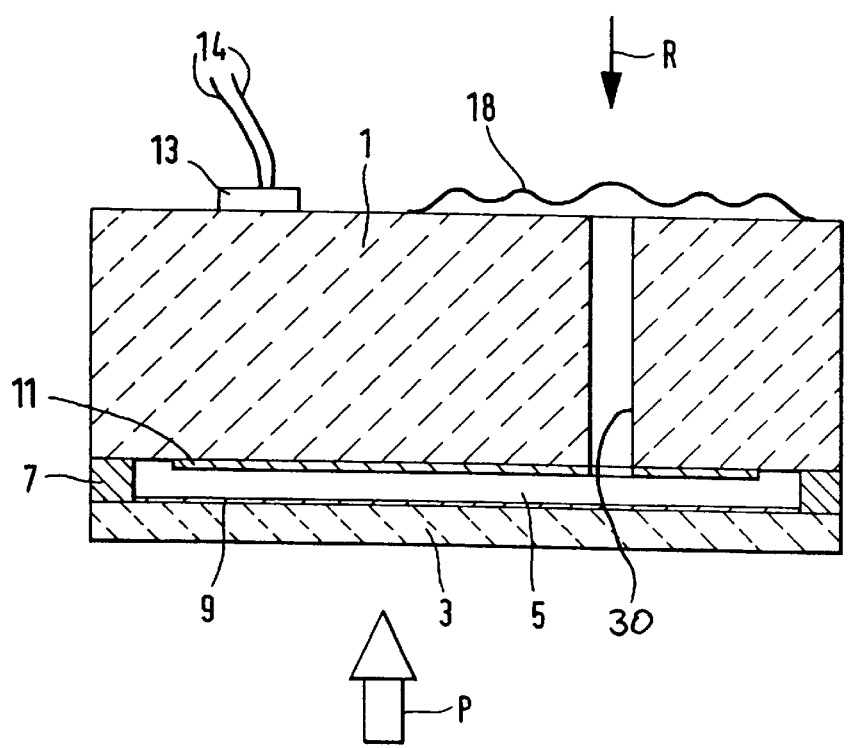
FIG. 2 shows a pressure-measuring cell with a bellows having a diaphragm.

A further pressure-measuring cell with a gas-filled resilient bellows 18 is represented in FIG. 2. The pressure-measuring cell can be installed in a housing in the same way as the pressure-measuring cell represented in FIG. 1. The two pressure-measuring cells differ from one another only in the form and the arrangement of the bellows 17 and 18, respectively. In the case of the exemplary embodiment of FIG. 2, as well, the basic body 1 has a continuous bore 30. The bellows 18 comprises a thin, slightly cambered corrugated diaphragm. An outer edge of the bellows 18 is connected to a rear side of the basic body 1 averted from the measuring diaphragm 3. The corrugated diaphragm encloses a small volume with the basic body 1 and covers the continuous bore. The interiors of the bellows 18, the bore and the measuring chamber 5 form a single cavity which is sealed in a gas tight fashion and is filled with a gas, for example air. The reference pressure acts on the bellows 18 from outside. The mode of operation corresponds to that of the exemplary embodiment previously described.

It is advantageous in each case if the bellows 17, 18 has a stiffness which is small by comparison with a stiffness of the measuring diaphragm 3. The stiffness of the measuring diaphragm 3 and bellows 17, 18 is determined by the properties of the materials used, their thickness and their shape. The sensitivity of the relative-pressure sensor, and thus the measuring accuracy which can be achieved at best is limited by the stiffness of the measuring diaphragm 3. The less the stiffness of the bellows 17, 18, the softer it is, the more accurately the internal pressure follows the reference pressure R, and the smaller are the effects of the diaphragm bellows 17 and 18, respectively, on a measuring signal. If the stiffness of the bellows 17, 18 is small by comparison with that of the measuring diaphragm 3, the internal pressure follows the reference pressure R with an accuracy which is within the measuring accuracy prescribed by the measuring diaphragm 3.

Particularly suitable are resilient materials, in particular metals such as, for example, a copper-beryllium alloy. However, it is also possible to employ a high-grade steel or a resilient plastic. Such resilient materials also offer the advantage of a very low hysteresis in the case of deformations.

The stiffness of the bellows 17, 18 and measuring diaphragm 3 can be specified quantitatively in the form of a pressure/volume constant. In this case, a pressure acting is referred to a change, induced by this pressure, in the internal volume of the bellows and/or in the internal volume of the measuring chamber. The pressure/volume constant can be determined either experimentally or, in an approximate fashion, by calculation. Given suitable dimensioning, the pressure/volume constant can be smaller by a factor of 1000 to 10,000 than that of the measuring diaphragm 3.

A relative-pressure sensor in accordance with the exemplary embodiment of FIG. 1 which, for example, is designed for a measuring range of 40 kPa (=400 mbar) has a pressure/volume constant of approximately 30 kPa/mm$^3$ (=300 mbar/mm$^3$) in the case of the use of a measuring diaphragm 3 in the shape of a circular disk and made from an aluminum oxide ceramic with a thickness of 0.25 mm and a diameter of 25 mm. By contrast, in the case of a diameter of 23 mm and a thickness of the diaphragms 19, 21 of 20 $\mu$m, the bellows 17 has a pressure/volume constant of approximately 5 Pa/mm$^3$ (=0.05 mbar/mm$^3$), the diaphragms 19, 21 being constructed as corrugated diaphragms and consisting of a copper-beryllium alloy.

As is generally customary with relative-pressure sensors, in the case of the relative-pressure sensors according to the invention, as well, calibration is undertaken with reference to pressure and temperature. In this case, the starting point assumed at the factory is a prescribed mean reference pressure, for example 1.013 10$^5$ Pa (=1013 mbar). Because of the resilience and the low stiffness of the bellows 17, 18, these relative-pressure sensors can detect relatively large deviations of a mean reference pressure from the prescribed mean reference pressure, without the linear range of the sensor characteristic being left. Within this linear range, it suffices to set the zero point of the relative pressure sensor at the site, in order to obtain the same measuring accuracy as is achieved in the case of the prescribed mean reference pressure. A relative-pressure sensor calibrated at sea level can thus also be used in mountains, for example at an elevation of 2000 m, without losses of accuracy.

While the invention has been illustrated and described in detail in the drawing and foregoing description, such illustration and description is to be considered as exemplary and not restrictive in character it being understood that only exemplary embodiments have been shown and described and that all changes and modifications that come within the spirit of the invention are desired to be protected.

What is claimed is:

1. A relative-pressure sensor having
    a gas-filled measuring chamber, which is sealed with a pressure-sensitive sensitive measuring diaphragm,
        on the outside of which a pressure to be measured acts during operation,
    a gas-filled compressible resilient bellows,
        on which a reference pressure acts from outside during operation,
        whose internal volume depends on the reference pressure, and
        which is connected to the measuring chamber in order to adapt an internal pressure prevailing in the measuring chamber to the reference pressure, and
    a transducer for converting a pressure-dependent deflection of the measuring diaphragm into an electric measured variable.

2. The relative-pressure sensor as claimed in claim 1, in which the bellows comprises two diaphragms interconnected at their outer edges.

3. The relative-pressure sensor as claimed in claim 2, in which the diaphragms are corrugated diaphragms.

4. The relative-pressure sensor as claim in claim 1, in which
    the measuring diaphragm is arranged on a basic body,
    the basic body has a continuous bore, and
    the bellows is a corrugated diaphragm
        which is connected with an outer edge to a rear side of the basic body averted from the measuring diaphragm and
        covers the bore.

5. The relative-pressure sensor as claimed in claim 1, in which the bellows has a stiffness which is small by comparison with a stiffness of the measuring diaphragm.

6. The relative-pressure sensor as claimed in claim 1, in which the bellows comprises a high-grade steel or a copper-beryllium alloy.

7. The relative-pressure sensor as claimed in claim 2, in which the bellows has a stiffness which is small by comparison with a stiffness of the measuring diaphragm.

8. The relative-pressure sensor as claimed in claim 3, in which the bellows has a stiffness which is small by comparison with a stiffness of the measuring diaphragm.

9. The relative-pressure sensor as claimed in claim 4, in which the bellows has a stiffness which is small by comparison with a stiffness of the measuring diaphragm.

10. The relative-pressure sensor as claimed in claim 2, in which the bellows comprises a high-grade steel or a copper-beryllium alloy.

11. The relative-pressure sensor as claimed in claim 3, in which the bellows comprises a high-grade steel or a copper-beryllium alloy.

12. The relative-pressure sensor as claimed in claim 4, in which the bellows comprises a high-grade steel or a copper-beryllium alloy.

13. The relative-pressure sensor as claimed in claim 5, in which the bellows comprises a high-grade steel or a copper-beryllium alloy.

* * * * *

UNITED STATES PATENT AND TRADEMARK OFFICE
CERTIFICATE OF CORRECTION

PATENT NO. : 6,425,291 B1
DATED : July 30, 2002
INVENTOR(S) : Karl Flögel

It is certified that error appears in the above-identified patent and that said Letters Patent is hereby corrected as shown below:

Title page,
Item [56], add the following cited reference to the
FOREIGN PATENT DOCUMENTS section

-- 0 524 550    1/27/93    EP --

Signed and Sealed this

Tenth Day of June, 2003

JAMES E. ROGAN
*Director of the United States Patent and Trademark Office*